United States Patent [19]
Brockman et al.

[11] Patent Number: 5,592,530
[45] Date of Patent: Jan. 7, 1997

[54] TELEPHONE SWITCH DUAL MONITORS

[75] Inventors: Pierce E. Brockman, Garland; John I. Ayers; Gary S. Ruwaldt, both of Plano, all of Tex.

[73] Assignee: Inet, Inc., Plano, Tex.

[21] Appl. No.: 377,978

[22] Filed: Jan. 25, 1995

[51] Int. Cl.$^6$ .............................. H04M 1/24; H04J 1/16; H04J 1/00
[52] U.S. Cl. .................. 379/34; 379/10; 379/15; 370/250; 370/252
[58] Field of Search .............................. 379/1, 9, 10, 15, 379/34, 207, 230, 93, 94, 22, 23; 370/13, 17, 68.1, 110.1

[56] References Cited

U.S. PATENT DOCUMENTS

| | | | |
|---|---|---|---|
| 5,426,688 | 6/1995 | Anand | 379/10 |
| 5,457,729 | 10/1995 | Hamann et al. | 370/17 |
| 5,473,596 | 12/1995 | Garafola et al. | 370/68.1 |
| 5,475,732 | 12/1995 | Pester, III | 379/22 |
| 5,521,902 | 5/1996 | Ferguson | 379/10 |
| 5,539,804 | 7/1996 | Hong et al. | 379/34 |

*Primary Examiner*—Wellington Chin
*Assistant Examiner*—Paul Loomis
*Attorney, Agent, or Firm*—Winstead Sechrest & Minick, P.C.

[57] ABSTRACT

A system is provided for monitoring the operations of a mated pair of switching nodes in a telephone network. A first monitor is provided which is operable to capture data on all of the connection links of a first switching node of the mated pair. A second monitor is provided which is operable to capture data on all of the connection links of a second switching node of the mated pair. The first and second monitors capture selected telephone switching messages on the links of the mated pair. Each monitor compiles either a primary or secondary record of switching messages pertaining to a particular call or transaction being routed by the mated pair of switching nodes. The primary record is maintained by the monitor which detects the first message which initiates a particular call or transaction. Subsequent messages pertaining to that call or transaction that are captured by the other monitor are compiled in a secondary record. At the completion of the call or transaction, selected messages stored in the secondary call record are transferred to the monitor containing the primary record by means of a communications bus connecting the two monitors. The composite record is then analyzed by the monitor containing the primary record to evaluate the performance of the telephone switch and to perform other tasks, such as calling card fraud detection and service assurance applications.

23 Claims, 4 Drawing Sheets

TELEPHONE SWITCH DUAL MONITORS

TECHNICAL FIELD OF THE INVENTION

The present invention relates in general to testing and monitoring systems for evaluating the operations of telephone switches, and more particularly to such monitoring systems which are arranged to capture data between nodes of a telephone switching system where the data flows between mated nodes.

BACKGROUND OF THE INVENTION

For approximately the past five years telephone companies and carriers in the telecommunications industry have been migrating toward an SS7 based signaling network, which is a common channel signaling network. This is a departure from what is traditionally called inband signaling, which relied on tone signals within the actual voice circuits to allow one switch to notify another switch of an incoming call. Common channel signals, such as an SS7 based signal system, use dedicated channels to pass digital messages between systems for call setup, call control, call routing, and other functions. These dedicated channels are a separate network from the network of circuits that carries the actual voice and data signals. An SS7 network can be thought of as a separate switching system which is used prior to, during, and at the end of the actual call for the purpose of routing control information. Whenever two switches or elements in the SS7 network have to pass call control information to one another during or prior to a phone call, they pass this data via the SS7 network.

An SS7 network traditionally has three basic types of network node elements. One of them is the Service Switching point (or SSP), which may be a central office switch, a tandem switch or an end office switch. A second principal node element is the Service Control point, or SCP. An SCP acts as a database query server for the rest of the network. An SCP is used in such applications as routing 800 calls, tracking roamers in a cellular network, and Alternate Billing Service/Line Identification Database services (or ABS/LIDB) which provide operator-type services. The third principal node element is the Signal Transfer point, or STP. An STP is essentially a packet switch which routes the messages from SSPs and SCPs to SSPs and SCPs.

Effectively, these three different types of nodes can be combined into a single node. However, in North America, they are not. An SSP performs only switch functions, an SCP only control functions, and an STP only signal transfer functions. In Europe, all of these different functions may be combined into one node.

The SS7 network, therefore, carries a great deal of information and is extremely critical to the operation of the phone system. If an SS7 network is not functioning, or if portions of it are not operating, the phone system simply cannot deliver phone calls, even though all of the voice circuits are operating properly. The capacity and complexity of the SS7 network is small in terms of circuitry and band width utilized by an end user compared to previous voice and data networks. The circuitry of the SS7 network is therefore much more critical. The actual elements in the SS7 network do not provide all the information required in network operations to manage and to determine the health and state of an SS7 network. It is therefore necessary for the telephone industry to deploy surveillance equipment to monitor the links connecting the nodes of the SS7 network.

The topology of the SS7 network is such that STPs are deployed in a mated pair configuration at geographically separate locations. Connected to a mated pair of STPs will be a set of SSPs and SCPs. This conglomeration of SSPs, SCPs and mated Pair STPs is called a cluster. Clusters are then connected by D-Quad links between STP mated pairs.

When any transaction or message is sent between two different devices on the network, it is often the case that the messages going from switch A to switch B travel one route on the network while the messages going from switch B to switch A travel a different route. The network surveillance equipment that monitors the link is designed to capture and correlate as much signalling information as possible regardless of network activity. Because of the different data paths that messages may take, it is difficult to do this correlation above what is called the transport layer when monitoring links at the STP sites. An example of an application level problem would be where a subscriber has a problem getting his calls delivered. The telephone company may attempt to fix the problem by doing a trace of all data pertaining to that subscriber's phone number, but the data may not all be located at one point. The data can be distributed randomly between two mated STPs associated with them. The data may be all in one STP, or split in some fashion, partially in one STP and partially in the other STP of the mated pair, which may be in a different city many miles away.

For applications related to one telephone number, there are a variety of ways of solving the problem of having the data located at two different nodes. Because the system is looking for just one call at a time (of all the thousands of calls that are occurring), it is possible to employ distributed triggers that trap only messages pertaining to that phone number.

However, when it is desired to go a step further by employing automated equipment that is continually monitoring the delivery of all calls in real time, problems occur. For instance, if it is desired to track how many calls are being abnormally dropped, or how many calls have abnormal completion, the problem of data being in two different places becomes formidable. In the single phone number example, it was possible to define a trigger for that phone number and when the trigger occurred, pass the corresponding information needed to coordinate tracking of the call to another device in the distributed network. However, selecting individual triggers won't work when the telephone company attempts to track all the calls all the time.

What is needed, then, is a distributed state machine that can capture all of the SS7 messages within a mated pair cluster and correlate the fragmented SS7 messages pertaining to a particular call or transaction to a single data record. Furthermore, what is needed are systems and methods for filtering out redundant or unnecessary SS7 messages in order to compile call transaction records containing a minimum amount of essential data in order to evaluate overall system performance and to diagnose system errors when they occur.

Furthermore, the ability to capture all of the SS7 messages within a mated pair cluster and correlate the fragmented SS7 messages makes other improvements to telephone network services possible. In addition to the performance monitoring applications outlined above, there is a need for systems which are capable of generating call detail records from the SS7 messages of a mated pair cluster for use in billing systems and to implement a fraud detection system for certain types of telephone calling cards. Furthermore, telephone monitoring systems are needed which enable a user to implement a call trace mechanism that can track all SS7 messages associated with a particular phone number in order to retroactively trace harassing or obscene phone calls. Finally, there is a need for a telephone monitoring system which can monitor the SS7 messages of a mated pair cluster in order to implement what is known as "mass call onset detection." Mass call onset detection is useful in circumstances where a large number of callers attempt to call a single phone number at the same time, such as where radio stations give away prizes to callers who call in immediately, thereby creating a mass call-in. Mass call onset detection applications detect this situation early as the number of SS7 messages pertaining to a particular phone number increases rapidly and alert the phone company quickly to the large number of busy conditions associated with a given phone number.

SUMMARY OF THE INVENTION

The present invention provides link monitoring devices located at the STP sites. The monitoring devices of the present invention key off the links to the SS7 itself, so that all data on the SS7 circuits entering the STPs are monitored. A level of filtering is provided to capture only the data which are necessary for providing call detail records. The STP is the central routing point for the SS7 data. The monitoring devices are connected by a communication link that enables the monitoring devices to track and correlate all the SS7 data at an application layer in a distributed fashion across two STPs. From this, one can determine error conditions at the application layer of the network. One can also generate information that could be used for fraud detection and could generate another level of call detail records.

An example of fraud detection and control may involve the tracking of calling card phone calls. Calling cards are similar to credit cards, but are used exclusively to pay for phone calls. If the present invention were tracking all the calls occurring for all the different calling card numbers on the network, it could then detect the fact that a certain calling card was used at one particular location at a given time and thirty minutes later, the same calling card number was used again across the country. Since there is only one of those calling cards in existence and it is not possible to travel across the country that fast, this would be an indication of fraudulent usage of the calling card. The present invention is able to provide such call transaction detail summaries because it is able to track all the transactions in real time and can then correlate the transactions across the entire phone network.

A simplistic approach to tracking SS7 data would be to capture all data traffic on the links to an STP and then pass all of the information from one site to another. But, in such an approach, the band width requirements would be equal to the SS7 network itself and this would not be economical or practical. The present invention overcomes this problem by correlating SS7 data in real time and passing on only the correlation information and critical information that is deemed necessary. By truncating or summarizing the information that is captured, the present invention enables the phone system to look for error conditions and to record only that information needed to generate call detail records.

When a particular service actually does require all of the data, the present invention will send that data across in a non-real time fashion after the call. For instance, it is assumed that a very low percentage of calls actually have errors in them. So, the present invention can pass a very limited amount of information while it tracks all calls to detect any errors. If an error is detected, the present invention can pass all the data across, in a non-real time fashion, but only for that particular call, for that particular transaction.

A great deal of information in SS7 messages is not needed in order to generate call detail records. For example, in an 800 request, two messages are involved, a query to the SCP and a response back from the SCP, which is the 800 number translation. Basically, a message goes from the switch to an SCP requesting a routing number for an 800 call. The return message contains that routing number. When the return message is sent, the only essential data that must be passed across is the routing number, the message type, the transaction I.D. which is used to correlate the message, and then the two network addresses of the two devices on each end. This represents a reduction to about 30 bytes of data, as opposed to a return transaction message which has about 60 bytes of data in the SS7 message itself. In other applications, such as ISDN User part, the return message may be reduced to less than 15 bytes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figures 1, 2:
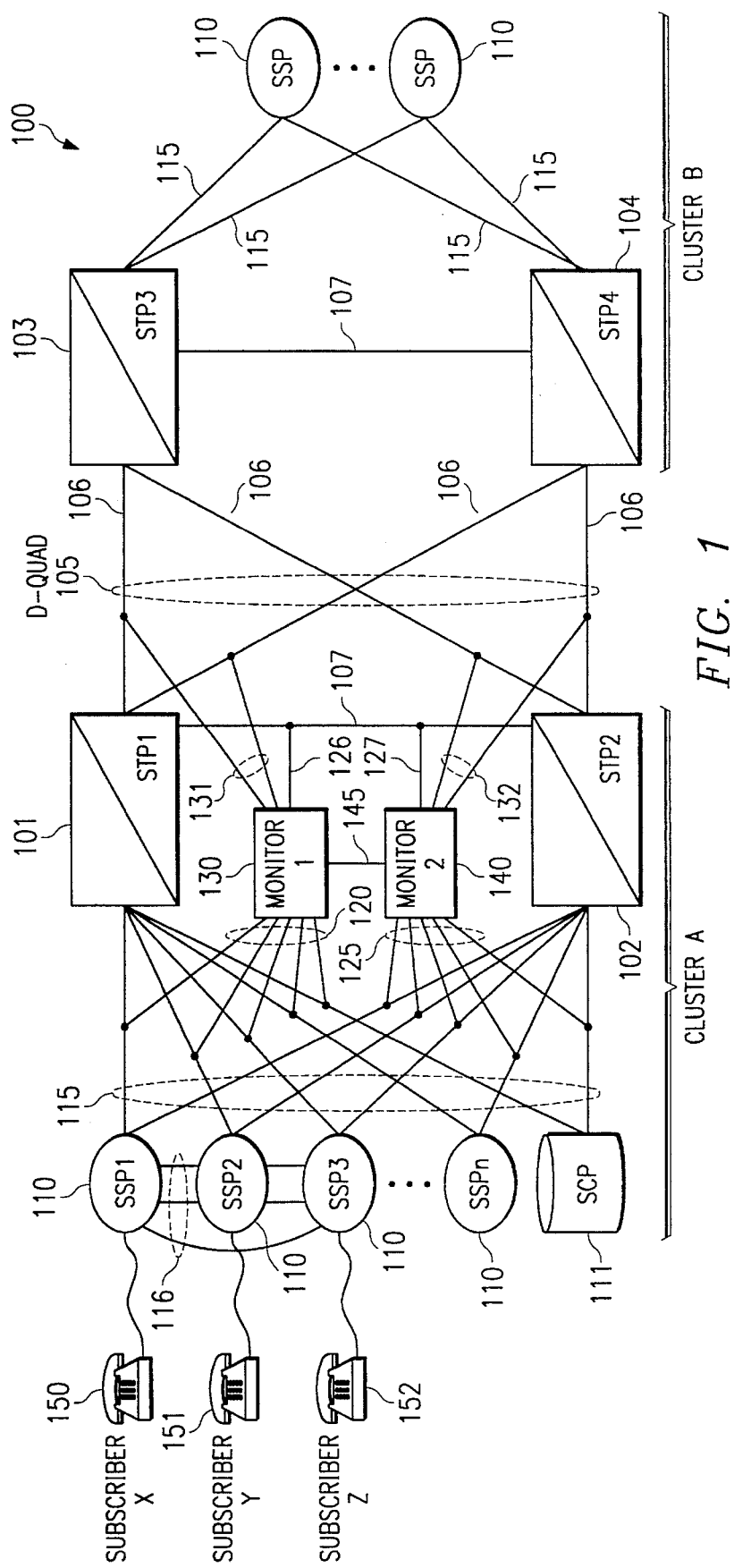
FIG. 1 shows two clusters within the telephone network, each containing a mated pair of STPs and their associated SSPs and SCPs.
FIG. 2 shows a 24 bit Signalling point Code data word divided into three sub-fields.

FIG. 1 depicts a quasi-associated quad structure 100, which is the basic SS7 network structure used in North America. The primary components are Signaling End points (SEPs) and Signaling Transfer points (STPs). The STPs are responsible for routing signaling messages from one SEP to another. For reliability, the architecture embodied in the American National Standard for SS7 recommends that SEPs be connected to the SS7 network via at least two STPs, known as a mated pair. The SEPs can be Switching points (SPs), Service Switching points (SSPs), Service Control points (SCPs), or Operator Services Systems (OSSs). These SEPs are connected to the STPs via high-speed signaling links. For the purpose of simplicity, FIG. 1 depicts only the connection of SSPs and SCPs to a mated pair of STPs.

FIG. 1 contains a typical SS7 cluster (Cluster A) that includes a mated pair of STPs 101 and 102 (STP1 and STP2) and associated SSPs 110 and an SCP 111. The mated pair of STPS are in geographically separated locations. If SSP1 wishes to send a message to SSP2, it can send the message through STP1 or through STP2 along the A-links 115 (access links). The STPs are "packet" switches. For the purposes of this disclosure, the term "packet" is synonymous with "message" as it applies to the present invention. The function of an STP, then, is to route messages or transfer signals. Two STPs in a mated pair communicate by a C-link set 107 that carries network management data pertaining to system failures and routing information. In the event of failures, the C-link set is also used for routing application data. Also shown in FIG. 1 is Service Control point 111. SCP 111 is the database computer for the network and is responsible for such functions as 800 number routing and tracking mobile phone subscribers.

Each network cluster can have up to 256 members. FIG. 2 shows a 24-bit Signaling point Code. Each signaling point in a signaling network is uniquely identified by its Signaling Point Code. In the United States and Canada, this point code consists of three sequential eight-bit fields; a Network Identifier (NID), a Network Cluster (CLU), and a Cluster Member (MEM). For large networks, a unique Network Identifier is assigned. Such a network may consist of up to 256 network clusters, each of which may consist of up to 256 members.

STPs are always assigned a unique Network Cluster number, with a Cluster Member equal to zero. For example, in FIG. 1, STP1 may have the Signaling point Code "255-254-000" and STP2 may have the Signaling point Code "255-255-000." The remaining elements of Cluster A, the SSPs and the SCPs, all share the same Network Identifier (NID) and Network Cluster (CLU) with each other, and the CLU of the SSPs is different from the CLUs of STP1 and STP2. Only the Cluster Member field of each SSP differs from the other SSPs. For example, the Signaling point Codes of the SSPs and SCPs may range between the values of "255-253-001" and "255-253-255."

The mated pair of STPs in Cluster A are linked to another mated pair of STPs 103 and 104 (STP3 and STP4) in Cluster B by a D-Quad link set 105. D-link sets connect different clusters in the same network. B-link sets are used to connect different networks. For simplicity in this discussion, we will assume a single network but it should be understood, of course, that the present invention may be used across multiple networks with the same operational characteristics.

Also shown in FIG. 1 are F-links 116 which connect individual SSPs, such as SSP1 and SSP3. The individual monitors of the present invention may also be used to monitor the performance of a single SSP, rather than two STPs in a mated pair, by deploying one monitor in such a fashion that it monitors all A-links and F-links connected to a single SSP. Such a configuration would be particularly important in European telephone systems, which often do not rely on STPs in mated pair configuration.

In a basic call scenario, Subscriber X owns telephone 150 which is connected to SSP1, which is an end office, and Subscriber Y owns telephone 151 which is connected to SSP2, which is also an end office. For the sake of simplicity, it is assumed that neither telephone 150 nor telephone 151 is an 800 number. If Subscriber X places a phone call to Subscriber Y, SSP1 must route that call to SSP2 before it can be sent to telephone 151. To accomplish this, SSP1 knows it must send the phone call through STP1 or STP2 in order to reach SSP2.

Every SS7 message contains a routing label consisting of a Destination Point Code (DPC), Origination Point Code (OPC), and the signaling link selection code. For example, in an SS7 message from SSP1 to SSP2, the OPC would be 255-253-001 and the DPC would be 255-253-002. As noted previously, all signaling points within a network have the same network identifier. Thus, all intranetwork message routing can be done by using only the network cluster and cluster member fields. Different SS7 standards were first drawn up by ANSI, Bellcore and the International Consultative Committee for Telephone and Telegraph (CCITT), which has since become the International Telecommunication Union (ITU). The CCITT has issued protocol recommendations for SS7 which include Integrated Services Digital Network End User part (ISDN-UP or ISUP), and Signaling Connection Control Part (SCCP). Within SS7, ISUP has been adopted as the interoffice signaling system for circuit switched basic call control. ISUP is also used for supporting call-related supplementary services, such as calling line identification presentation service and user-to-user signaling service.

Figure 3A:
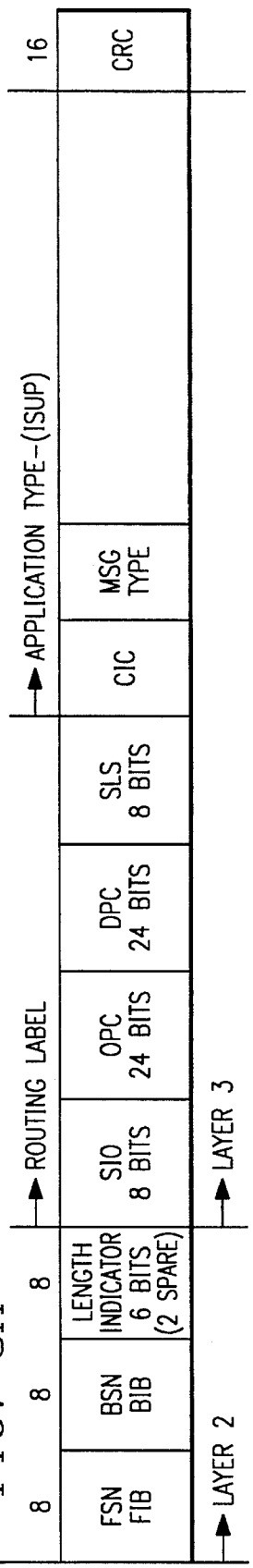
FIG. 3A shows a layered SS7 message structure for an ISUP type application and FIG. 3B shows the SS7 functional layers of the protocol stack.
Figure 3B:
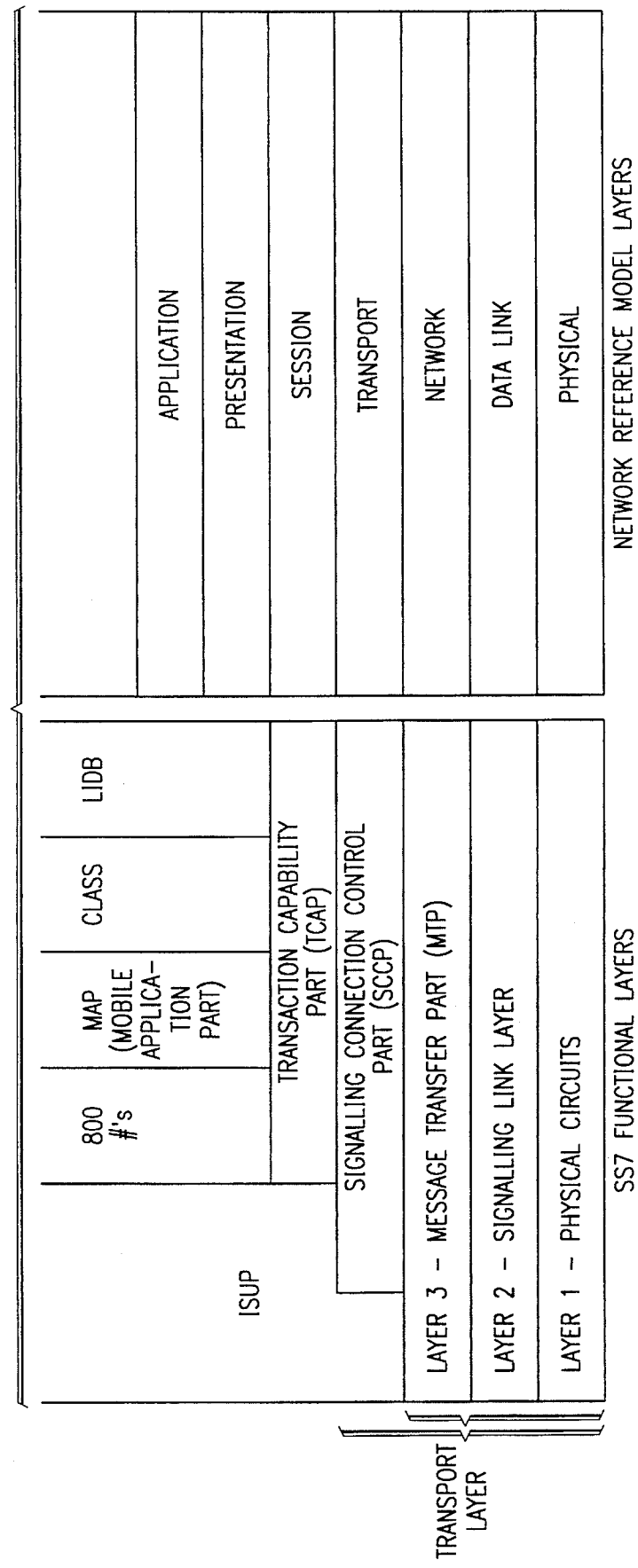

FIGS. 3A and 3B depict the layered protocol of SS7 message structure. Layer 1 (not shown in FIG. 3A) is the physical layer which defines the electrical circuit characteristics of the SS7 network itself and is unimportant to the operation of the present invention. The first layer shown in FIG. 3A consists of 24 bits of Layer 2 information, known as the Link Data Layer, which are used to transmit data over a single link. Layer 2 information consists of an initial eight bits called FSN/FIB, eight bits called BSN/BIB, and finally eight bits which contain 2 spare bits and 6 Length Indicator bits.

Also shown in FIG. 3A is Layer 3 information which is of great importance to the present invention. Layer 3, which is sometimes called the Message Transport Part (MTP), contains the routing label that is essential to every SS7 message. The routing label consists of three main parts. The first eight bits are the Service Indicator Octet (SIO). The SIO consists of the User Part (four bits) which indicates the Application Type, Network Indicator (two bits) and Message Priority (two bits). Immediately following the SIO are the OPC and the DPC. The next portion of the label is the Signaling Link Selection code (SLS). The SLS effectively determines which routes the messages traverse. For any given call or transaction, an SSP will allocate the same SLS for all messages that it sends during that call. In the absence of failures, all messages for that call that are sent by the SSP will traverse the same route through the SS7 network down to the link level. However, messages coming in the reverse direction from SSP2 to SSP1 may be traveling on a different route. Those messages are originating in SSP2 will have a different SLS code than messages originating in SSP1. Each SSP will use a constant SLS throughout an entire caller transaction so that messages never arrive at the destination in reverse order. If SSP1 were to send out messages on a first A-link and then another message on a second A-link, they might arrive at SSP2 in reverse order. However, if SSP1 always utilizes the same link, the messages sent from SSP1 to SSP2 must always arrive in the same order in which they were generated.

The User part of the routing label is also known as the service indicator field. User Part is important in the operation of the present invention since it defines the application type. For the purposes of this disclosure, the application type that will be discussed will be the ISUP, or ISDN User part. It should be understood that the systems and methods disclosed in the present application apply equally well to application types other than ISUP, such as SCCP/TCAP.

The User Part in the routing label will define what the remaining portion of the SS7 message following the SLS will look like. At the end of the SS7 message there will be a character check field, known as CRC, which consists of two bytes (16 bits). This field is a cyclic redundancy check which is used to verify the received bits of the SS7 message.

In an ISUP message, the first field following the SLS is the Circuit Identification Code (or CIC), which identifies to which voice and data circuit on the trunk, and to which voice and data circuit between two different switches, the message pertains. The next field after the CIC is the Message Type (or MSG TYPE). The technical name for Message Type is H1H0 Code.

FIG. 3B depicts the functional layers of the SS7 network and the corresponding equivalent layers in a network reference model. In applications such as ISUP, the transport layer is comprised of Layers 1, 2 and 3 and the application interfaces directly with Layer 3, the Message Transfer Part (MTP). In other applications, such as TCAP, the transport layer includes Layer 4, the Signalling Connection Control Part (SCCP), and the application interacts with the MTP through the SCCP. Layered on top of the TCAP are applications such as toll-free 800 number calls, mobile calls, CLASS and LIDB (Line Identification Database).

Figure 4:
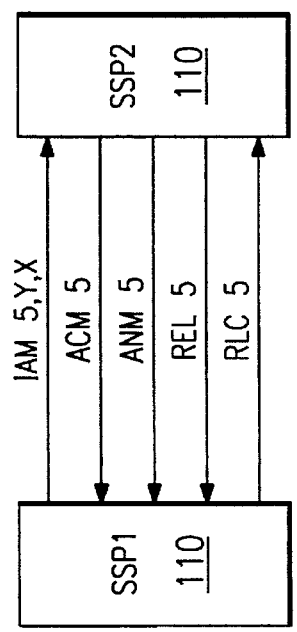
FIG. 4 shows selected SS7 messages in a typical ISUP call transaction between two SSPs.

FIG. 4 shows a typical ISUP call scenario between SSP1 and SSP2 with various message types shown, such as IAM (Initial Address Message), ACM (Answer Complete Message), ANM (Answer Message), REL (Release Message), and RLC (Release Complete Message). The data field following MSG TYPE will be entirely determined by the bit values in the MSG TYPE field. The typical ISUP call scenario is initiated when telephone 150 attempts to call telephone 151. In these SS7 messages, SSP1 is the Origination Point Code (OPC) and SSP2 is the Destination Point Code (DPC). The ISUP call scenario depicted in FIG. 4 begins with an Initial Address Message (IAM). All of the messages in FIG. 4 are routed through STP1 or STP2, which use the OPC and DPC to determine that SSP1 is attempting to communicate with SSP2. In FIG. 4, arrowheads on each line connecting SSP1 and SSP2 indicate the direction that the message is flowing, i.e., from SSP1 to SSP2 or from SSP2 or SSP1.

As previously mentioned, Layer 2 is the Link Data Layer and is used to transmit and receive messages over a single link reliably and to determine whether a link is functioning properly. Layer 2 data in a given message consists of an FSN/FIB, BSN/BIB, a Signal Unit Length and a CRC. There are multiple message types under Layer 2 which fall into three principal categories: LSSUs, FISUs and MSUs. LSSU stands for Link Status Signal Unit. Two Layer 2 processes on each side of a link will send LSSUs back and forth to bring the link up. FISU stands for Fill In Signal Unit. FISUs are sent over the link when the link is idle. MSU stands for Message Signal Unit. MSU is pertinent only to information above Layer 2, while LSSU and FISU affect only Layer 2.

In addition to ISUP, there are many other applications defined by User part in the SIO field of Layer 3. These applications include SCCP (Signaling Connection Control Part). The principal call scenario described in this application is for an ISUP application, but the systems and methods of the present invention apply equally to other applications. SS7 provides TCAP, which is a tool kit for an application at one SS7 node to invoke execution of a procedure at another node and exchange the results of such an invocation. SS7 also has the SCCP, which provides extensive routing capability. In SS7, an application can directly address another application if it has the node address of that application. Otherwise, it can use the global title translation capability of SCCP. All SS7 signaling messages, such as ISDN-UP for telephony and TCAP for database access, are used between network nodes.

Figure 5:
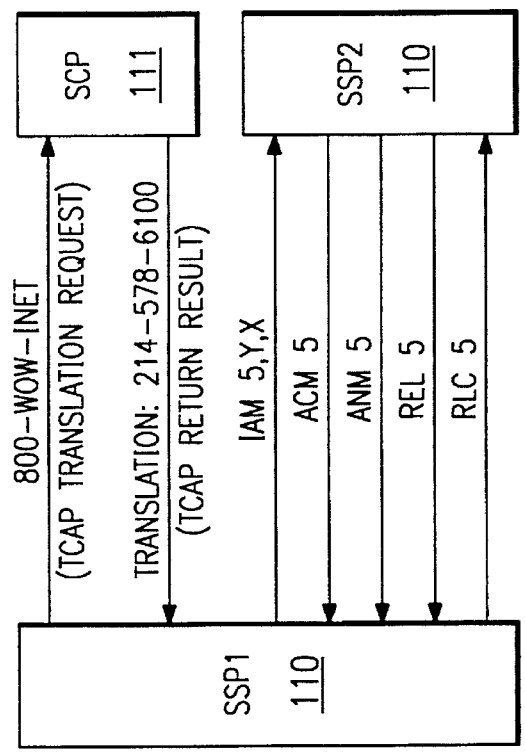
FIG. 5 shows selected SS7 messages in a typical TCAP transaction application, wherein an 800 number telephone call has been placed from one SSP to another SSP.

FIG. 5 depicts a TCAP transaction whereby Subscriber X places a toll-free call using an 800 number to Subscriber Y. The TCAP transaction begins with a query which is sent to the SCP for the mated pair cluster to obtain a translation for the 800 telephone number. The DPC contains the signaling point code for the SCP. The SCP will search its database for the telephone number which corresponds to the 800 request and will relay the translated phone number back to the OPC, which is SSP1. When SSP1 has received the translated phone number it will initiate a phone call to Subscriber Y (telephone 151) through SSP2 in a manner similar to the ISUP transaction depicted in FIG. 4.

Returning now to FIGS. 4 and 1, in a typical ISUP call scenario, a connection is established between Subscriber X and Subscriber Y connected to SSP1 and SSP2 respectively. In short, Subscriber X picks up the telephone 150, gets a dial tone and dials Subscriber Y's phone number. SSP1 collects the digits from Subscriber X and determines that it must route the call to SSP2 over a voice circuit. To do this, SSP1 transmits an IAM message through STP1 or STP2 to SSP2, as shown in FIG. 4. SSP1 will allocate an idle circuit code, such as "5" in FIG. 4. SSP1 will then transmit the called Party number (i.e., the telephone number of Subscriber Y) as part of the IAM, followed by the calling Party number. There is a lot of other information in the IAM, but it is not directly applicable to tracking the call. This information may be gathered and used by the present invention after the call has been tracked.

Assuming that Subscriber Y is on-hook (i.e., telephone 151 not in use), an Address Complete Message (or ACM) will immediately be sent by SSP2 back through STP1 or STP2 to SSP1. An ACM will simply contain the idle circuit code "5", but will not contain the phone numbers of either Subscriber X or Y. The lack of phone numbers in the messages is important to the operation of the present invention because the ACM may traverse through a different STP back to SSP1 than was used by the IAM. It is therefore not possible to correlate messages by their phone numbers alone.

Eventually, someone will pick up telephone 151 and answer it. At that point, SSP2 will send an Answer Message (or ANM) back to SSP1. A conversation may now take place because SSP1 has connected telephone 150 to circuit 5 and SSP2 has connected telephone 151 to circuit 5.

Eventually, Subscriber X or Y will hang up. In this example, Subscriber Y will hang up first and generate a Release Message (REL) for circuit 5 that will be sent to SSP1. SSP1 will respond by sending Release Complete Message (RLC) back to SSP2 for circuit 5. At that point, circuit 5 is now available for use for another phone call. If Subscriber X had hung up first, the arrow directions for REL and RLC would be reversed.

The present invention is shown in FIG. 1 as item 130 (Monitor 1) and item 140 (Monitor 2), which are connected by communications bus 145. Monitor 1 monitors all of the links to STP1 by means of link taps 120, 126 and 131 and tracks the calls through STP1. Monitor 2 performs the same functions for STP2 using link taps 125, 127 and 132. At any given time, there could be many calls going simultaneously between SSP1 and SSP2. Since there can be up to 255 SSPs in the cluster, there may be thousands of messages entering and leaving STP1 and STP2 each second.

A key advantage of the present invention is to deploy the monitoring equipment at the STPs, rather than the SSPs. Deploying at the SSPs allows for easier collation of a smaller amount of data, since it is all related to a single switch. However, monitoring at the SSPs would require an order of magnitude increase in the amount of equipment used. Furthermore, individual SSP data would then have to be correlated with other SSPs to formulate call records. Monitoring STPs is a superior solution since the STPs route all of the SS7 messages and there are far fewer STPs.

For economic reasons, then, it is more desirable to deploy surveillance systems in an SS7 network at the STPs. However, the basic problem with deploying the monitoring equipment at the STP is that in the application layer, different messages which are related (i.e. which pertain to the same call or the same transaction) may traverse through different STPs. Statistically, for a single mated pair for a given call, there is a 50% chance that all the data is not going to be found in one STP. The present invention allows for the situation where one monitor captures all of the messages and the other monitor captures none, as well as the situation where both monitors capture Part of the messages.

It is unrealistic to transmit all of the data captured by each monitor to the other monitor because this would exceed the bandwidth of the communications bus 145 from Monitor 1 to Monitor 2. By distributing the call and transaction correlation processing between Monitor 1 and Monitor 2, the bandwidth requirements of bus 145 can be greatly reduced. For ISUP data, for example, messages may be correlated based on OPC, DPC and CIC for any given message. Monitor 1 and Monitor 2 may exchange other key information, such as MSG TYPE, but only information necessary to generate call records will be exchanged, while the remaining SS7 message data is stored but not transmitted to the other monitor.

It is important to note that each monitor will see each SS7 message twice. For example, an IAM message sent from SSP1 to SSP2 through STP1 will first be seen on the A-link connecting SSP1 to STP1, and then again on the A-link connecting STP1 to SSP2. Monitor 1 and Monitor 2 take this into account for each SS7 message in order to avoid erroneously assigning each message to different call records.

For the purpose of discussing the operations of Monitor 1 and Monitor 2, it will be assumed that all SS7 messages originating in SSP1 will be sent to SSP2 by way of STP1, and that all SS7 messages originating in SSP2 will be sent to SSP1 by way of STP2. SS7 systems are robust and utilize STPs in mated pairs for redundancy purposes. If SS7 messages from SSP1 to SSP2 that traverse through STP1 are interrupted by a failure of the links to STP1, those SS7 messages will automatically be re-routed through STP and the call will continue with all SS7 messages between SSP1 and SSP2 in both directions being routed through STP2. The present invention can continue to maintain the call records in such a case because OPC, DPC and CIC data fields will maintain their correlation with the phone calls.

Figure 6:
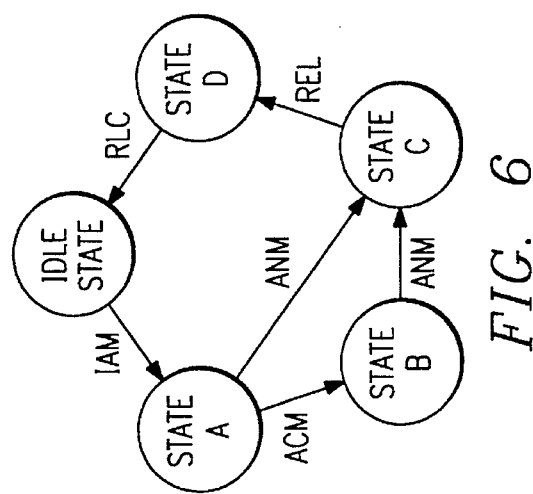
FIG. 6 shows a complete machine cycle of a typical state machine of the present invention as it cycles from state to state in response to the capturing of selected SS7 messages.

To trace a single call, one could typically implement a state machine such as the one shown in FIG. 6. An IAM message triggers one instance of the state machine. Subsequent SS7 messages cause the state machine to transition through different states until an RLC returns the machine to an idle state. While one IAM will instantiate only one instance of the state machine, at any given time there are thousands of instances of the state machine being executed. In most other processor applications, a state machine is typically implemented in one processor, in one location. In the present invention, however, the SS7 messages may be sent through different STPs, causing the SS7 messages to be captured by different monitors. One instance of the state machine may therefore be distributed between one processor in Monitor 1 and one processor in Monitor 2.

The present invention therefore utilizes two key triggers: a primary trigger which instantiates a state machine, and a secondary trigger of which there may be multiple kinds. Secondary triggers do not instantiate a state machine but rather relate to a pre-existing state machine. An example of a secondary trigger would be the ACM that returns from SSP2 to SSP1 through STP2 in FIG. 4. Initially, Monitor 1 is triggered by an IAM, where the key data is OPC, DPC (SSP1 and SSP2), CIC, which is "5" in FIG. 4, and a time stamp of the IAM. In response to this primary trigger, Monitor 1 will instantiate a primary state machine, thereby creating a call record. Inside that call record, Monitor 1 stores the IAM and other information, such as a time stamp and the SS7 link identifier where the message was seen. The time stamps are generated internally by Monitor 1 and Monitor 2.

The IAM, as a primary trigger, will instantiate a state machine in the monitor which detects the IAM. In the scenario presented in FIG. 4, the IAM is detected by Monitor 1 (through STP1) and Monitor 1 becomes the primary state machine. If any of the subsequent SS7 messages are sent through STP2, Monitor 2 will be a secondary state machine for that transaction, but the actual state transitions will be executed by the primary state machine. Whether a monitor is primary or secondary for a call transaction is determined dynamically according to which monitor detects the principle trigger. Thus, Monitor 1 may be primary for some calls, while Monitor 2 is primary for others.

Call records are maintained within both the primary and the secondary state machines and all call records are indexed according to OPC, DPC and CIC. In the scenario shown in FIG. 4, after Monitor 1 instantiates a primary state machine from the IAM message, Monitor 2 will detect an ACM (secondary trigger) going from SSP2 to SSP1 through STP2 and will use the OPC, DPC and CIC to correlate the ACM with the correct call record among the many call records simultaneously maintained by Monitor 1 and Monitor 2.

The OPC and DPC are determined relative to the IAM message only. When Monitor 2 detects the ACM, Monitor 2 will determine that it is not the primary state machine for this OPC, DPC and CIC combination. Furthermore, since an ACM has a different MSG TYPE than an IAM, Monitor 2 will know that the OPC and DPC are reversed because the ACM always travels in the reverse direction of the IAM.

In the absence of a dual seizure wherein two conflicting IAM messages are generated at the same time by SSP1 and SSP2, a properly generated IAM from SSP1 to SSP2 will trigger Monitor 1 to create a primary call record. When Monitor 2 detects an ACM, Monitor 2 examines its call records to see if it has the primary call record. If it does, that means that Monitor 2 also detected the IAM and that STP2 is routing all SS7 messages for that call. In such a case, Monitor 2 will run the state machine locally and Monitor 1 will not be involved in generating a call record for that call (unless there is a failure in the SS7 network). In the scenario in FIG. 4, that is not the case since Monitor 1 detected IAM going through STP1. Monitor 2 will therefore create a secondary call record.

Monitor 2 will store the ACM, a time stamp and the link identifier in the secondary call record. Monitor 1 does not alert Monitor 2 that it has detected an IAM message and that it contains the primary state machine for the call. This is important because if the present invention were to rely on a first monitor alerting a second monitor before the second monitor stores ACM data, a race condition would be introduced. The ACM might go through SSP2 before Monitor 1 had time to alert Monitor 2 of the detected IAM. To avoid race conditions associated with such transmission delays, a monitor of the present invention that detects any SS7 message that is not an IAM message and for which the monitor does not already have a primary call record will assume that the other monitor already has the primary call record for the IAM message corresponding to the detected non-IAM message. Therefore, Monitor 2 will place all subsequent ACMs, ANMs, RELs, and RLCs into a secondary call record unless Monitor 2 already contains a primary call record for the corresponding IAM message.

Another key performance advantage is realized by the present invention by not using an alert between Monitor 1 and Monitor 2. By not implementing an alert system between Monitor 1 and Monitor 2, the bandwidth requirements of bus 145 are greatly reduced in certain instances. For example, in the telephone call scenario previously described wherein all SS7 messages pertaining to a Particular call traverse between SSP1 and SSP2 through STP1, all of the SS7 messages are sent through the A-links of STP1. In such a case, Monitor 1 captures all of the SS7 messages and Monitor 2 captures none of the SS7 messages. It would be a waste of bandwidth on bus 145 for Monitor 1 to send an alert to Monitor 2, which will have no activity related to the telephone call. Furthermore, even in situations where both Monitor 1 and Monitor 2 detect SS7 messages pertaining to a single call, bandwidth requirements on bus 145 are reduced simply by the fact that it is never necessary to send an alert to the other monitor when an IAM message has been received.

After Monitor 2 has captured the subsequent SS7 messages corresponding to the initial IAM message captured by Monitor 1, Monitor 2 can transmit the contents of the secondary call record across the bus 145 to Monitor 1. Likewise, Monitor 1 can send SS7 message data to Monitor 2 for those call transactions for which Monitor 2 is the primary state machine. There is no absolute time requirement for this cross-transmission of data. While the primary state machine stores the full IAM message in its primary call record, the secondary state machine does not send the entire contents of the ACM, ANM, etc. messages across the communications bus 145, since the bandwidth requirement would be too great. For most SS7 messages, only the essential secondary call data is sent across, such as the OPC, DPC, CIC, time stamp and message type (ACM). On certain messages, such as a Release (REL), more data may be sent (i.e., Release Cause).

When Monitor 1 receives the ACM message from Monitor 2, Monitor 1 may traverse to the next state of the state machine. The order in which the different state transitions occur is important and they cannot be made arbitrarily in response to a detected SS7 message. In situations where system failures occur, messages may be seen out-of-sequence, or the messages may be sent through the wrong STP. For example, in the scenario depicted in FIG. 4, Monitor 2 should detect the ACM, the ANM, and the REL as they pass through STP2. However, a system failure may cause the ANM message to be sent from SSP2 to SSP1 via STP1, instead. In such a case, the ANM would be detected by Monitor 1. Monitor 1 would know that the receipt of the ANM message on the links to STP1 indicates the presence of an error in the SS7 network, because the ANM message should have been downloaded from the communications bus 145 connecting Monitor 1 and Monitor 2.

Even if Monitor 2 properly detected the ACM, the ANM, and the REL, as they traversed through STP2, as depicted in the scenario in FIG. 4, the messages may have been detected out-of-order. For example, the ANM message may have preceded the ACM message. The present invention utilizes the time stamps as Part of the call record to detect out-of-order message sequences. One of the abnormal conditions that would cause messages to be out-of-sequence occurs when a switch is not following the correct handshake protocol with an STP. Monitor 1 and Monitor 2 utilize synchronized time stamps in order to insure proper detection of out-of-sequence messages. When the primary state machine has stored all of the SS7 messages related to the call transaction, the monitor will sort the SS7 messages by their time stamps to determine if the state machine that was executed was valid. In a preferred embodiment of the present invention, GPS receivers may be used to synchronize the time stamps with time-of-day data transmitted by the GPS satellites. In other embodiments, the present invention utilizes network time-synchronization protocols to synchronize the time stamps of Monitor 1 and Monitor 2. The end result is that the time stamps of each message at the link level recorded by Monitor 1 and Monitor 2 will always be accurate relative to each other.

Under certain circumstances both Monitor 1 and Monitor 2 may see the same IAM message and both will instantiate primary state machines. This may occur when the link set between SSP1 and SSP2 has failed or when a dual seizure occurs. SSP1 will transmit an IAM message to STP1 which will be detected by Monitor 1. Because the link from STP1 to SSP2 has failed, STP1 will be unable to send the IAM over that link to SSP2. As mentioned previously, when SSP1 selects a link, it will attempt to use that link throughout the call for all messages which it sends to SSP2. Therefore, SSP1 will not automatically reroute the IAM message to SSP2 by way of STP2. In order to complete the IAM message, STP1 will send the IAM message to STP2 by way of C-link 107 which connects STP1 and STP2. STP2 will thereafter transmit the IAM message to SSP2 by means of one of the available links connecting STP2 and SSP2. Monitor 2 will therefore detect the IAM message going from STP2 to SSP2 on the A-links monitored by Monitor 2. This scenario may also occur in the reverse direction, if SSP2 tries to send an IAM message to SSP1 via STP2 while the link sets connecting SSP2 and STP2 are failed.

Since both Monitor 1 and Monitor 2 detected IAM messages, both machines will instantiate state machines for the call and assume the role of primary state machine. Initially, this does not seem to present a problem, since both Monitor 1 and Monitor 2 will continue to see all of the SS7 messages routed in the same fashion as the IAM message for as long as the A-links are failed. Therefore, both Monitor 1 and Monitor 2 will create complete call records for the transaction. A problem will occur, however, if the link recovers in the middle of the call. In such a situation, further SS7 messages may be routed between SSP1 and SSP2 in both directions entirely through STP1 and Monitor 2 would no longer detect these SS7 messages and would therefore contain an incomplete call record.

To allow for this situation, the present invention also monitors the C-link 107 between STP1 and STP2 by link taps 126 and 127. Therefore, when one of the monitors detects an IAM entering an STP on an A-link and exiting on a C-link, the monitor will be alerted to the fact that the link sets associated with the STP are at least partially failed. The monitors will notify each other of this fact and, if the link recovers during a call, the primary state machine, which completes the call, will contain the valid call record while the other monitor will discard the incomplete call record.

Dual seizure occurs when two IAM messages are sent on the same circuit from two SSPs with no response message (i.e., an ACM) detected between the IAM messages. A dual seizure is easily processed if only one monitor is involved. When two monitors are involved, a situation arises where two primary call records are allocated, one in each monitor, with no secondary call record being allocated. To avoid checking every call for a dual seizure, only calls that have certain error conditions, such as an IAM and ACM sequence error, will be analyzed by the present invention. A monitor that has such an error condition will issue a query to the other monitor requesting whether a primary call record exists for the call in question. The queried monitor will respond with a negative reply if no such call record exists and the monitor that issued the query will handle the call as it would for any error condition. Otherwise, the queried monitor will send a positive reply indicating that a dual seizure has occurred and also indicating which monitor will contain the primary call record for the call. The control decision is used to minimize the amount of data transferred. The monitor not controlling the call will change its primary call record to a secondary call record and the call will proceed from that point as any other call.

A further requirement of the present invention is the establishment of timeout conditions related to each state machine. While the state machines of the present invention are designed to delay execution until all SS7 messages pertaining to a Particular call or transaction have been received, this requirement is limited by the fact that some SS7 messages necessary to complete a call record may never be received as a result of an error condition in the call. The present invention utilizes timeout conditions to define the maximum duration of any phone call in order to detect certain errors, such as where a Release message is never received. Such an error is then stored as part of the call record. The problem with this situation, however, is determining the timeout value. People can place calls for hours. Therefore, to avoid maintaining call records indefinitely, the present invention holds call records for 24 hours after the expiration of a user defined timeout condition.

The present invention delays processing long enough to take care of transmission delays between Monitor 1 and Monitor 2. The processing delay is 2 to 3 seconds after Release, or at most 5 seconds. The delay does not affect the real time performance of the present invention, since calls typically last minutes or hours and a few additional seconds of delay are not detrimental to system performance. The critical requirement of the present invention is to track all of the calls passing through each STP, not to record each failure within milliseconds of its occurrence. Assuming that all of the data has been stored in the primary state machine, that the state machine has executed properly, and that there are no errors, the data in the call record may be discarded if it is not needed for billing or other applications.

The monitors of the present invention are composed of three distinct groups of circuitry. The physical layer monitoring circuitry is the hardware required to tap into the A-links 115, C-links 107 and D-links 106 associated with the mated pair of STP's. The physical monitors are connected to a second layer of circuitry comprised of I/O processors which function as input processors that generate time stamps for the SS7 messages and distribute the SS7 messages to a layer of application processors. The monitors of the present invention contain numerous application processors which execute the state machines for each call transaction. The I/O processors utilize the OPC, DPC and CIC of the IAM message to assign a Particular call transaction to an application processor. The I/O processors are responsible for load-sharing across the application processors. All of the SS7 messages related to one call transaction will be handled entirely by one application processor in each monitor connected to STP1 and STP2.

Figure 7:
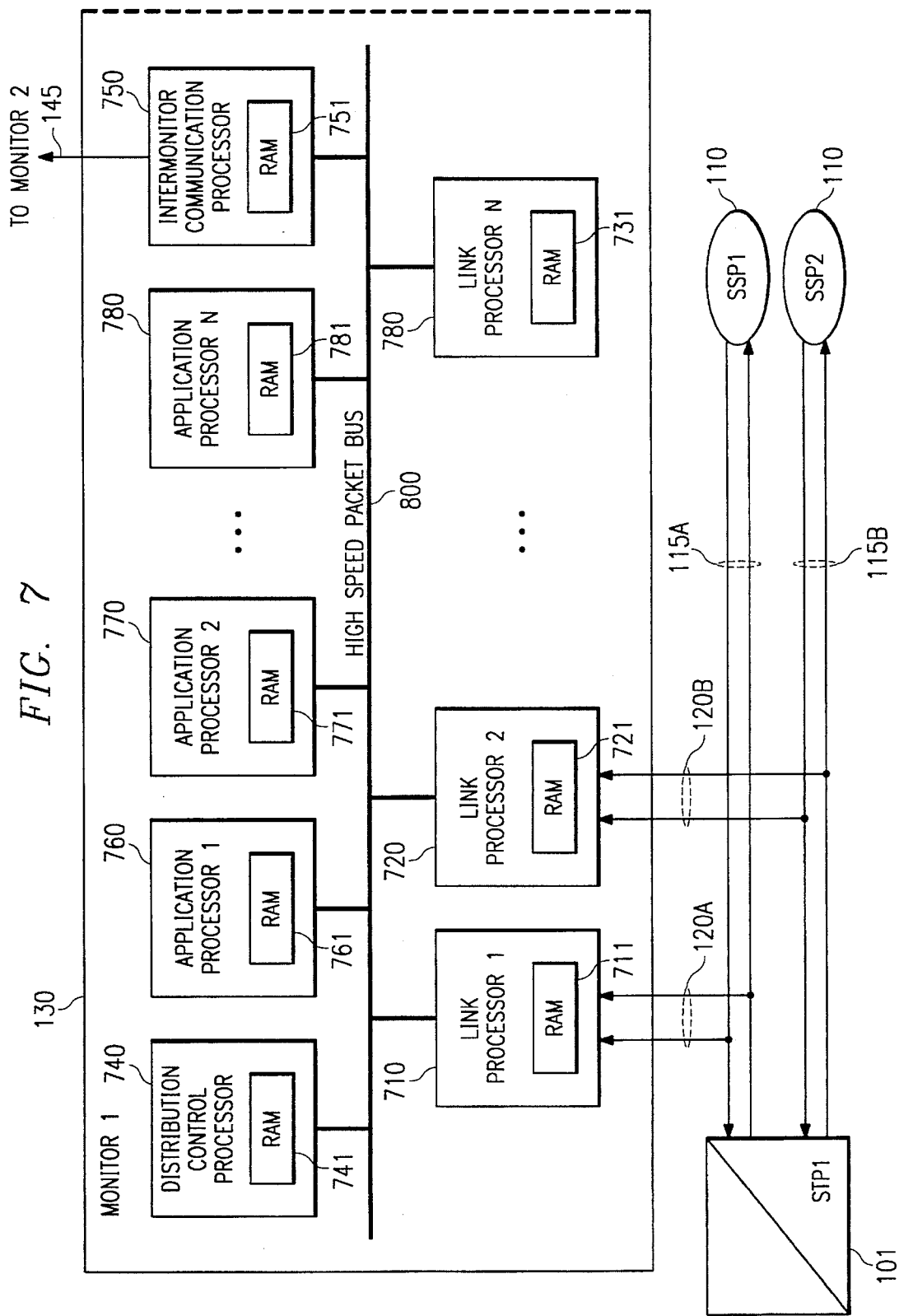
FIG. 7 shows a general block diagram of the architecture of one of the monitors of the present invention.

FIG. 7 shows the internal architecture of Monitor 1 and its physical connections to A-links 115A and 115B of STP1. Link tap 120A and link tap 120B route the captured SS7 messages from the bidirectional A-links to link processor 710 and link processor 720 contained in Monitor 1. While FIG. 7 demonstrates the internal architecture of Monitor 1, it should be understood that the monitors of the present invention are identical and therefore the architecture shown in FIG. 7 would apply equally to Monitor 2.

Monitor 1 contains a plurality of link processors that capture SS7 messages from the A-links surrounding STP1. Link processors 710, 720 and 730 have associated RAM memories 711, 721 and 731 and are connected to a high speed packet bus 800 in Monitor 1. Application processors 760, 770 and 780 are also connected to high speed packet bus 800 and have associated RAM memories 761, 771 and 781. Selected SS7 messages are sent from Monitor 1 to Monitor 2 on bus 145 by means of intermonitor communication processor 750, which is connected to high speed packet 800 and has an associated RAM memory 751. Finally, distribution control processor 740, which has an associated RAM memory 741, is also connected to bus 800. Bus 800 is used as the internal communication path between the processors of the monitors of the present invention.

To demonstrate the processing of a typical SS7 message, attention is now drawn to link processor 710, which monitors A-link 115A through link tap 120A. When an IAM, the first SS7 message of any telephone call, is captured by link processor 710 on link tap 120A, link processor 710 stores the entire message in cache in RAM 711 and compares the OPC, DPC and CIC of the SS7 message with a local look-up distribution table contained in RAM 711 in order to determine which application processor the SS7 message must be sent to for further execution of the state machine. In a telephone call between SSP1 and SSP2, both link processor 710 and link processor 720 will be capturing the same SS7 messages pertaining to that call on link taps 120A and 120B (remember, each monitor sees an SS7 message twice: once as it enters and once as it leaves an STP). The OPC, DPC and CIC of each SS7 message will enable link processors 710 and 720 to correctly distribute the SS7 messages to the same application processor.

If link processor 710 is unable to find an application processor that correlates to the Particular OPC, DPC and CIC of the just-captured SS7 message, link processor 710 will store the SS7 message in a queue in RAM 711 and send a request to distribution control processor 740 to determine to which application processor the SS7 message must be sent. Distribution control processor 740 contains a master list of OPC, DPC and CIC combinations in a look-up table stored in RAM 741. The look-up table of OPC, DPC and CIC combinations in RAM 741 contains every combination that is currently active in the system. If distribution control processor 740 does not contain a matching OPC, DPC, CIC combination for the captured SS7 message (as in the case of an IAM message), distribution control processor 740 will allocate an application processor to that OPC, DPC and CIC combination based on the load factor of each of the application processors 760, 770, 780, etc. in Monitor 1. The application processor that is least loaded will be allocated and, thereafter, all SS7 messages with that combination will be routed to that application processor.

Distribution control processor 740 will also inform all link processors which application processor is now handling all calls with that Particular OPC, DPC and CIC combination. All link processors will thereafter have a local record for that OPC, DPC and CIC combination and will be able to route future SS7 messages for all calls directly to the application processor, without having to send requests to distribution control processor 740. In this manner, link processor 710 and link processor 720 will be able to route SS7 messages received from A-links 115A and 115B directly to the proper application processor. The only time that distribution control processor 740 needs to be consulted by link processors 710, 720 and 730 is when a new combination of OPC, DPC and CIC is received.

The application processors 760, 770 and 780 in FIG. 1 are responsible for the execution of the state machines for each call transaction. In addition to generating a call record for the SS7 messages for which they are the primary state machine, the application processors also route SS7 messages for which they are the secondary state machine to the intermonitor communications processor 750 through the high speed packet 800. The intermonitor communications processor 750 minimizes the band width requirements of bus 145 by capturing groups of SS7 messages, rather than immediately transmitting these messages to Monitor 2. Since the handshaking protocol of bus 145 necessarily adds a certain amount of overhead to any data transmission between Monitor 1 and Monitor 2, transferring groups of messages together across bus 145 minimizes the band width on bus 145 by adding only one handshaking protocol to the group of messages. The band width requirement of bus 145 would be much greater if each individual SS7 message sent across bus 145 had its own handshaking protocol attached.

Intercommunications processor 750 also contains a look-up table in RAM 751 which intermonitor communications processor 750 uses to distribute SS7 messages which it receives from Monitor 2 on bus 145 to the appropriate application processor executing the primary state machine for the SS7 message received from Monitor 2. In this manner, intermonitor communications processor 750 distributes received SS7 messages directly to the application processors in the same manner that the link processors do. If the look-up table in the RAM 751 does not contain an OPC, DPC, CIC combination that matches the SS7 message received from Monitor 2 on bus 145, intercommunications processor 750 will query the distribution control processor 740 in the same manner as the link processors in order to obtain the identity of the appropriate applications processor to which the SS7 message must be sent.

As mentioned previously, if no errors are detected during the execution of a state machine, the ISUP data that is captured by the present invention is usually discarded. The data that is kept is needed for three basic applications. One application is performance monitoring, which has been discussed. Performance monitoring tracks all of the ISUP calls to check for errors in the network and the state machines accumulate this data. Another application is the call tracing mechanism. Call tracing allows the user to trace one particular ISUP call. The third application is called Call Detail Record (CDR) generation. Call Detail Record generation can be broken into different sub-applications, such as fraud detection, billing applications and service assurance applications implemented by the phone company.

If an error condition is detected, the present invention will save all the data for that particular call on disk for later analysis and correlation with other call data in other parts of the network. The primary state machine will detect an error condition in its call record and signal the other monitor to send across the corresponding data in the secondary call record that had not already been sent. This analysis is done after call completion.

Call tracing operates in a similar fashion to performance monitoring. The call data is saved and later analyzed in a non-real time fashion. Call tracing is applicable only to a small percentage of calls so as not to substantially increase the bandwidth requirements of the communications bus 145 between Monitor 1 and Monitor 2.

CDR generation creates a data record that can be sent to an external system explaining what occurred in the call. The pertinent data is the start time and end time of the call, calling number, the switching nodes involved, and other data used in a billing system. CDR's can be generated completely from the primary call record without signal units from the secondary call record. Call Detail Records are transmitted to external systems which analyze them for fraud detection, billing, and service assurance applications. The Call Detail Records may also be filtered to perform service assurance only for large customers, such as 800 numbers for catalog companies.

In certain applications where a phone call spans two sets of mated pair clusters, two sets of call records will be generated, one in the first cluster where the call originates, and another in the second cluster where the call terminates. Thus, two sets of primary state machines will be created. The present invention is capable of handling such transactions where, for example, a call is generated in SSP1 and is sent through STP1 to STP3 and on to an associated SSP of STP3. The present invention can recognize such phone calls because the SS7 messages will contain a different searching code, different OPC's, different DPC's and a different circuit ID. Monitor 1 and Monitor 2 use link taps 131 and 132 to monitor D-links 106 of D-Quad 105 to detect calls or transactions which send SS7 messages from a mated pair in one cluster to a mated pair in a separate cluster. The master call record generated by either Monitor 1 or Monitor 2 will be offloaded to an external system, which also receives a master call record from a monitor located in Cluster B. The external system thereafter executes performance monitoring, call tracing and CDR generation tasks.

Fraud detection is another example of a TCAP transaction performed by SCP1 that provides possible fraud information to the central fraud management system. Under this scenario, TCAP transactions which are related to calling card telephone calls are automatically routed to an external system which operates as a central fraud management system. The fraud management system will then compile call transactions related to a particular calling card number and examine the compiled records for indications of fraud, such as two uses within a short time span of the calling card number from telephones that are too far geographically separated to have been made by the same person. The central fraud management system will also compare the recent use of the calling card with the past frequency of use of the calling card to determine if there is an unusually high amount of activity on the card account, which also indicates potential fraud. Under either potential fraud scenario, the central fraud management system notifies a human operator who then may contact the owner of the calling card to investigate if the owner has actually made such uses of the card.

The previous portions of this disclosure involved the dual monitor configuration depicted in FIG. 1 wherein Monitor 1 monitored all of the link connections to STP1 and Monitor 2, a separate physical device monitored all of the links to STP2. In some configurations, Monitor 1 may be located close to STP1 and Monitor 2 may be located close to STP2 and communications 145 is quite long. In other configurations, however, Monitor 1 and Monitor 2 may be located next to each other in a separate facility remote from both STP1 and STP2. In this configuration, the link taps 120, 125, 126, 127, 131 and 132 are quite long in order to reach the locations of STP1 and STP2. Because Monitor 1 and Monitor 2 may be located far from STP1 and STP2, an additional advantage is realized in that one of the monitors may be eliminated altogether. In that configuration, a single monitor is used to monitor all of the links entering and leaving both STP1 and STP2. In order to implement a single monitor configuration, the monitor shown in FIG. 7 is divided internally into two logical monitors, although there is only one physical monitoring device. In a single monitor configuration, one half of the link processor cards would be dedicated to monitoring the links connected to STP1 and one half of the link processor cards in the monitor would be dedicated to monitoring the links of STP2. The processing of SS7 messages by the monitor shown in FIG. 7 in a single monitor configuration would proceed in a nearly identical fashion to the dual monitor configuration shown in FIG. 1 with one important and advantageous difference. Because only one monitor is being used and the internal architecture of the monitor is divided into two logical, rather than physical, monitors, all data transfers between primary call records and second call records maybe made on high-speed packet bus 800 rather than across communications bus 145. The need for inter-monitor communication processor 750 is eliminated and banned with problems associated with communications bus 145 are also eliminated.

Another alternative configuration of the dual monitor pair shown in FIG. 1 uses Monitor 1 and Monitor 2 to monitor not only STP1 and STP2 in Cluster A, but also to monitor STP3 and STP4 in Cluster B. Monitor 1 in this configuration would monitor all of the A-links, C-links and D-Quad links connected to STP1 and STP3 while Monitor 2 is connected to all of the A-links, C-links and D-Quad links of STP2 and STP4. Internally, the architecture of Monitor 1 would be divided into two logical devices, each logical device responsible for monitoring the SS7 messages entering and leaving STP1 and STP3. Likewise, the internal architecture of Monitor 2 would be divided into two logical devices, each half dedicated to monitoring the SS7 messages entering and leaving either STP2 or STP4. The logical device in Monitor 1 which monitors the links to STP1 will maintain primary and secondary call records in conjunction with the logical device in Monitor 2 which is monitoring the links to STP2. The logical device in Monitor 1 which monitors the links of STP3 will maintain primary and secondary call records in conjunction with the logical device contained within Monitor 2 which monitors the links connected to STP4.

One last configuration which requires the least amount of monitoring equipment employs a single monitor to test STP1, STP2, STP3 and STP4 in Cluster A and Cluster B. In a single monitor configuration, the internal architecture of the monitor would be divided into four logical devices, each of which is responsible for monitoring all of the A-links, C-links and D-Quad links to a single STP. In such an architecture, however, the amount of SS7 message traffic passing through the four STPs would have to be quite light in order not to overwhelm the capacity of the single monitor being used.

Although the present invention and its advantages have been described in detail, it should be understood that various changes, substitutions and alterations can be made herein without departing from the spirit and scope of the invention as defined by the appended claims.

What is claimed is:

1. A monitoring system for use in a telephone system having at least one pair of switches operating in mated relationship to one another such that call control information pertaining to a communication link carrying voice and data signals between a calling party and a called party will always pass through one or both of said pair of switches, wherein said pair of switches are geographically separated from each other and said pair of switches are separate from a communication network over which said communication link is established, said monitoring system comprising:

a pair of processors each associated with a particular one of said pair of switches, each said processor operable for receiving and temporarily storing therein selected call control information as said call control information passes through said associated switch, said stored calling information identifiable for a particular calling party and for a particular call transaction, wherein each said processor comprises means for storing all selected call control information for a particular call transaction in a unified list sorted by time of occurrence of said call control information; and means for combining said unified lists for all stored selected call control information for a particular call transaction in one or the other of said processors.

2. The invention set forth in claim 1 wherein said selected call control information is a subset of the calling protocol used in routing and controlling telephone calls.

3. The invention set forth in claim 2 wherein said subset includes said calling party identification, said called party identification and a communication network link identification for said communication link over which said communication is established and at least one field of data pertaining to operational aspects of the call.

4. The invention set forth in claim 3 further comprising:

a memory for storing a plurality of said unified lists; and a communications bus for transferring said selected call control information between said processors.

5. The invention set forth in claim 4 further comprising a second communications bus for transferring said unified lists to a computer database for use in telephone system applications.

6. The invention set forth in claim 5 wherein one of said telephone system applications is a billing application operable to calculate the charges associated with said particular call transaction.

7. The invention set forth in claim 5 wherein one of said telephone system applications is a fraud detection application operable to detect the fraudulent use of a calling card identification number by comparing said calling party identification and said time of occurrence of said call control information associated with said particular call transaction with a second calling party identification and a second time of occurrence of call control information associated with a second call transaction.

8. The invention set forth in claim 5 wherein one of said telephone system applications is an error detection application operable to detect errors in the operation of the mated pair of switches by comparing said selected call control information stored in said unified list with a known protocol of valid call control information for said particular call transaction.

9. A monitoring system for a pair of telephone switches operating in mated relationship to one another such that a plurality of call control data messages pertaining to a separate communication network carrying voice or data signals of a particular call transaction over a selected communication channel between a calling party and a called party will always pass through one or both of said pair of switches, said monitoring system comprising:

a first processor associated with a first of said pair of switches, wherein said first processor is coupled to each one of a plurality of data links connected to said first switch, wherein said first switch data links transfer said call control data messages into and out of said first switch, and wherein said first processor captures said call control data messages from said first switch data links and stores said call control data messages in a first call record;

a second processor associated with a second of said pair of switches, wherein said second processor is coupled to each one of a plurality of data links connected to said second switch, wherein said second switch data links transfer said call control data messages into and out of said second switch, and wherein said second processor captures said call control data messages from said second switch data links and stores said call control data messages in a second call record; and a communications bus coupled to said first processor and to said second processor for transferring at least one of said call control data messages between said first call record and said second call record whenever said first processor and said second processor both capture said call control data messages pertaining to said particular call transaction.

10. The monitoring system as set forth in claim 9 wherein said first processor stores said call control data messages associated with said particular call transaction in said first call record and said second processor stores said call control data messages associated with said particular call transaction in said second call record according to a subset of said call control data messages comprising an origination code associated with said calling party, a destination code associated with said called party, and a communication channel code associated with said selected communication channel.

11. The monitoring system as set forth in claim 10 wherein said first processor comprises a first clock means for providing a time stamp as part of said first call record whenever said first processor captures and stores one of said call control data messages and said second processor comprises a second clock means for providing a time stamp as part of said second call record whenever said second processor captures and stores one of said call control data messages and wherein said first clock means and second clock means are synchronized.

12. The monitoring system as set forth in claim 11 wherein said first processor further comprises means for comparing said call control data messages stored in said first call record with a known protocol of valid call control data messages for said particular call transaction to determine the operation of the mated pair of switches.

13. The monitoring system as set forth in claim 11 wherein said second processor further comprises means for comparing said call control data messages stored in said second call record with a known protocol of valid call control data messages for said particular call transaction to detect errors in the operation of the mated pair of switches.

14. The monitoring system as set forth in claim 11 wherein said first call record comprises a unified list of call control data messages captured by said first processor and call control data messages captured by said second processor and transferred to said first processor over said communications bus and wherein said second call record comprises a unified list of call control data messages captured by said second processor and call control data messages captured by said first processor and transferred to said second processor over said communications bus.

15. The monitoring system as set forth in claim 14 wherein said first processor further comprises a first means for comparing said unified list of call control data messages stored in said first call record with a known protocol of valid call control data messages for said particular call transaction to detect errors in the operation of said mated pair of switches.

16. The monitoring system as set forth in claim 15 wherein said second processor further comprises a second means for comparing said unified list of call control data messages stored in said second call record with a known protocol of valid call control data messages for said particular call transaction to detect errors in the operation of said mated pair of switches.

17. The monitoring system as set forth in claim 15 further comprising a second communications bus coupled to said first and second monitors for transferring said first call record and said second call record to a computer database for use in telephone system applications.

18. The monitoring system as set forth in claim 17 wherein one of said telephone system applications is a billing application operable to calculate the charges associated with said particular call transaction.

19. The monitoring system as set forth in claim 17 wherein one of said telephone system applications is a fraud detection application operable to detect the fraudulent use of a calling card identification number by comparing said origination code and at least one of said time stamps associated with said particular call transaction with a second origination code and a second time stamp associated with a second call transaction.

20. A method of monitoring a pair of telephone switches operating in mated relationship to one another such that a plurality of call control messages pertaining to a separate communication network carrying voice or data signals of a particular call transaction over a selected communication channel between a calling party and a called party will always pass through one or both of the pair of switches, the method comprising the steps of:

capturing the call control messages of the particular call transaction with a pair of monitoring devices, wherein each monitoring device is associated with one of the pair of telephone switches;

storing the captured call control messages in a memory table in each monitoring device;

establishing the memory table in one of the monitoring devices as a primary memory table and the memory table in the other monitoring device as a secondary memory table;

truncating the captured call control messages in the secondary memory table into a subset record comprising calling party identification, called party identification and communication network link identification;

transferring the subset record to the primary memory table; and merging the subset record with the captured call control messages stored in the primary memory table that correspond to the particular call transaction based on the calling party identification, called party identification and communication network link identification to thereby create a unified call record.

21. The method as set forth in claim 20 including the further step of transferring the unified call record to an external database for use in telephone system billing applications.

22. The method as set forth in claim 20 including the further step of comparing the captured call control information stored in the unified call record with a known protocol of valid call control information to thereby detect error conditions in the particular call transaction.

23. The method as set forth in claim 20 including the further step of comparing the calling party identification and a time of occurrence of the call control information associated with the particular call transaction with a second calling party identification and a second time of occurrence of call control information associated with a second call transaction to thereby detect the fraudulent use of a calling card identification number.

* * * * *